United States Patent
Carr et al.

(10) Patent No.: US 6,646,876 B2
(45) Date of Patent: Nov. 11, 2003

(54) ACOUSTIC ENCAPSULATING SYSTEM FOR HARD DRIVES

(75) Inventors: Daniel Shawn Carr, Austin, TX (US); Robert Warren Johnson, Pflugerville, TX (US); Jason Alan Shepherd, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 09/769,803

(22) Filed: Jan. 25, 2001

(65) Prior Publication Data

US 2002/0097557 A1 Jul. 25, 2002

(51) Int. Cl.[7] .................................................. G06F 1/16
(52) U.S. Cl. ....................................... 361/695; 361/685
(58) Field of Search .................................. 361/678, 679, 361/687, 274.1, 685, 690, 694, 695, 715, 686; 454/184; 62/259.2; 312/223.2

(56) References Cited

U.S. PATENT DOCUMENTS

| | | | | |
|---|---|---|---|---|
| 5,473,507 A | * | 12/1995 | Schwegler et al. | 361/679 |
| 5,526,228 A | * | 6/1996 | Dickson et al. | 361/695 |
| 5,644,472 A | * | 7/1997 | Klein | 361/679 |
| 5,680,293 A | | 10/1997 | McAnally et al. | |
| 5,761,034 A | * | 6/1998 | Chu | 361/687 |
| 5,936,836 A | * | 8/1999 | Scholder | 165/104.34 |
| 6,094,345 A | * | 7/2000 | Diemunsch | 165/80.3 |
| 6,104,608 A | * | 8/2000 | Casinelli et al. | 361/692 |
| 6,359,779 B1 | * | 3/2002 | Frank et al. | 361/685 |

* cited by examiner

*Primary Examiner*—Darren Schuberg
*Assistant Examiner*—Anthony Q. Edwards
(74) *Attorney, Agent, or Firm*—Haynes and Boone, LLP

(57) ABSTRACT

A hard drive encapsulating apparatus includes a housing having an air flow channel and an air flow port. Also, a sound suppression cavity is positioned between the channel and the port. A sound suppression material is mounted in the sound suppression cavity.

12 Claims, 5 Drawing Sheets

ACOUSTIC ENCAPSULATING SYSTEM FOR HARD DRIVES

BACKGROUND

The disclosures herein relate generally to a computer system and more particularly to a shroud for a hard drive used in a computer system.

Hard drives used in computer systems generate both heat and noise. Hard drives are a dominant source of noise in some desktop computers. Because customers expect quieter systems, hard drive noise must be reduced to achieve that goal.

Vibration isolation is a proven method for reducing hard drive noise, but there are natural limitations to the effectiveness of such systems. More aggressive acoustic targets require that the drive also be encapsulated to reduce airborne noise. Encapsulation naturally introduces new technical challenges on several fronts, so a new solution must offer significant acoustic improvements without compromising performance, manufacturability, or cost goals.

Encapsulation of hard drives has been attempted several times by PC manufacturers, with limited success. One encapsulation scheme completely seals the drive within a plastic enclosure and relies on conduction to a heatsink of the device and ultimately out to ambient air. While the technique is an acoustic success, manufacturability, space requirements, and thermal limitations inhibit its usefulness. Another approach has utilized a ducted encapsulation scheme that encloses the device within a large plastic box designed to allow airflow through the enclosure to minimize the thermal impact. A dedicated fan forces air through the box but does not sense hard drive temperature and leaves much to be desired in terms of manufacturability.

Therefore, what is needed is a device that reduces noise and improves thermal performance.

SUMMARY

One embodiment, accordingly, provides an apparatus and a method for reducing noise and improving thermal performance. To this end, a hard drive is encapsulated in a housing having an air flow channel in a first portion of the housing and an air flow port spaced from the air flow channel. A sound suppression cavity is provided in the housing between the channel and the port. A sound suppression material is mounted in the sound suppression cavity.

A principal advantage of this embodiment is that the device reduces noise and improves thermal performance by providing controlled, high velocity airflow over the hard drive.

DETAILED DESCRIPTION

Figure 1:
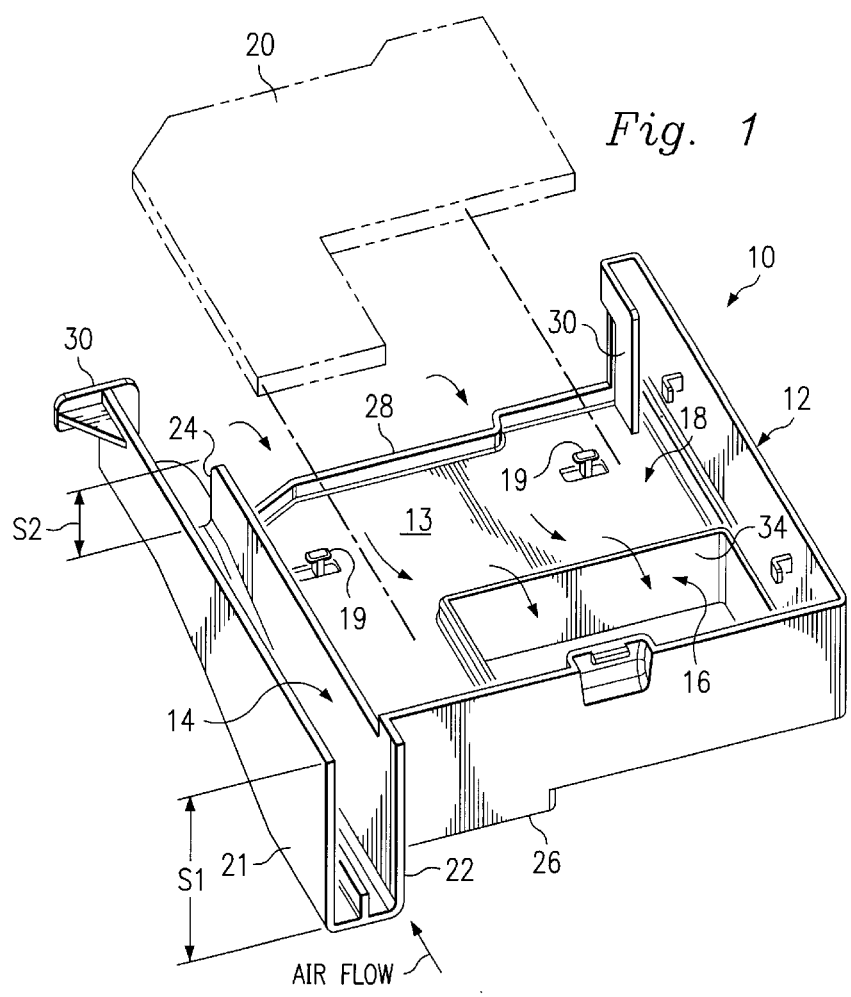
FIG. 1 is a perspective view illustrating an embodiment of an acoustic housing.

A hard drive encapsulation apparatus is generally designated 10 in FIG. 1, and comprises a housing 12 including an air flow channel 14 in a first portion of the housing 12, and an air flow port 16 in a second portion of the housing 12. The channel 14 and the port 16 are separated by a recessed sound suppression cavity 18 formed in a wall 13 of housing 12. Several other such cavities may also be provided. A mat 20 of suitable sound suppression material such as an acoustic foam material is mounted in the cavity 18 by mechanical attachment to tabs 19 mounted on wall 13. The housing 12 is preferably a one piece molded member formed of a suitable plastic material.

The channel 14 is elongated and extends along an edge 21 of housing 12 from an inlet 22 to an outlet 24. The inlet 22 is adjacent a first end 26 of housing 12 and the outlet 24 is adjacent a second end 28 of housing 12. The inlet 22 is of a first size S1 and the outlet 24 is of a second size S2 which is less than the first size S1. A pair of baffles 30 are included to assist in routing the airflow from the channel 14 to the port 16. The housing 12 forms part of the encapsulation system, completing the enclosure and providing better control of airflow and airborne noise.

The air flow port 16 is formed in wall 13 of housing 12 adjacent the cavity 18. A shroud 34 is formed at the port 16 for routing air flow to a cooling fan as discussed below.

Figure 2:
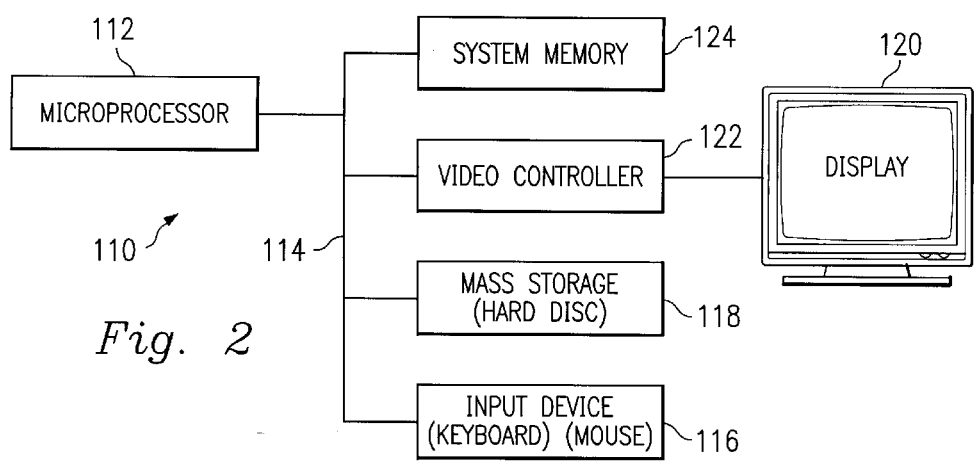
FIG. 2 is a diagrammatic view illustrating an embodiment of a computer system.

In one embodiment, computer system 110, FIG. 2, includes a microprocessor 112, which is connected to a bus 114. Bus 114 serves as a connection between microprocessor 112 and other components of computer system 110. An input system 116 is coupled to microprocessor 112 to provide input to microprocessor 112. Examples of input devices include keyboards, touchscreens, and pointing devices such as mouses, trackballs and trackpads. Programs and data are stored on a mass storage device 118, which is coupled to microprocessor 112. Mass storage devices include such devices as hard disks, optical disks, magneto-optical drives, floppy drives and the like. Computer system 110 further includes a display 120, which is coupled to microprocessor 112 by a video controller 122. A system memory 124 is coupled to microprocessor 112 to provide the microprocessor with fast storage to facilitate execution of computer programs by microprocessor 112. It should be understood that other busses and intermediate circuits can be deployed between the components described above and microprocessor 112 to facilitate interconnection between the components and the microprocessor.

Figure 3:
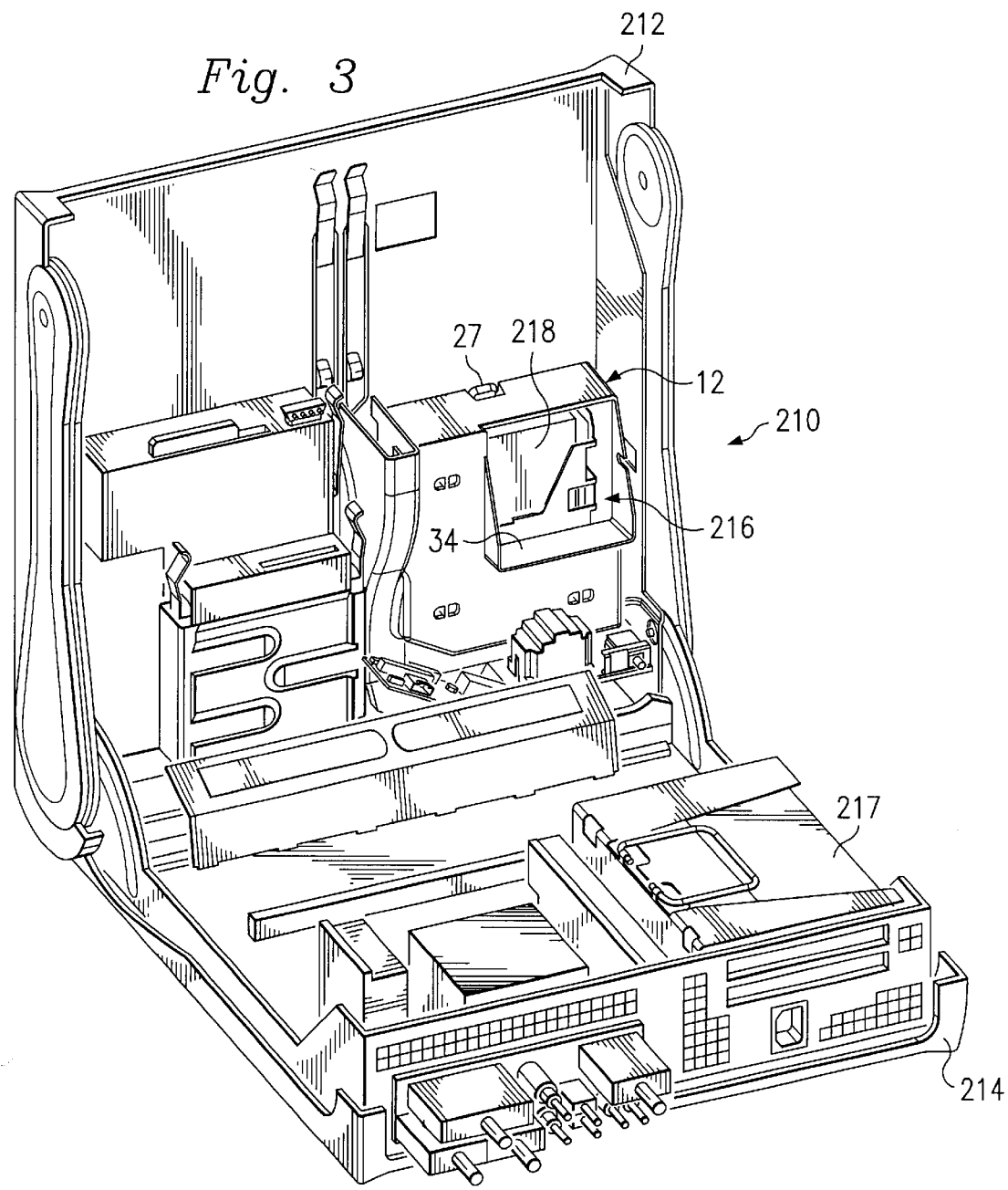
FIG. 3 is a perspective view illustrating an embodiment of a computer chassis.
Figure 4:
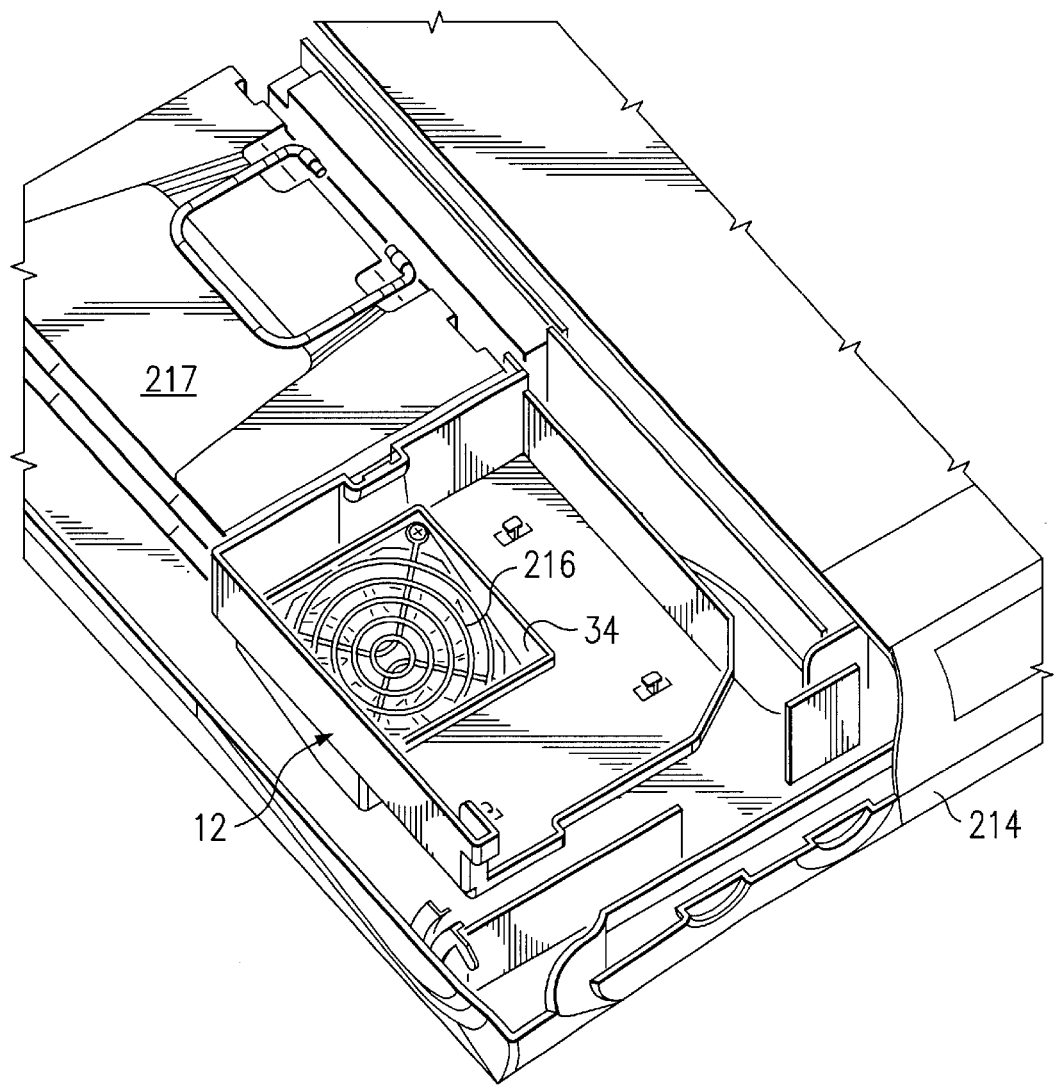
FIG. 4 is a partial view of the chassis of FIG. 3.
Figure 5:
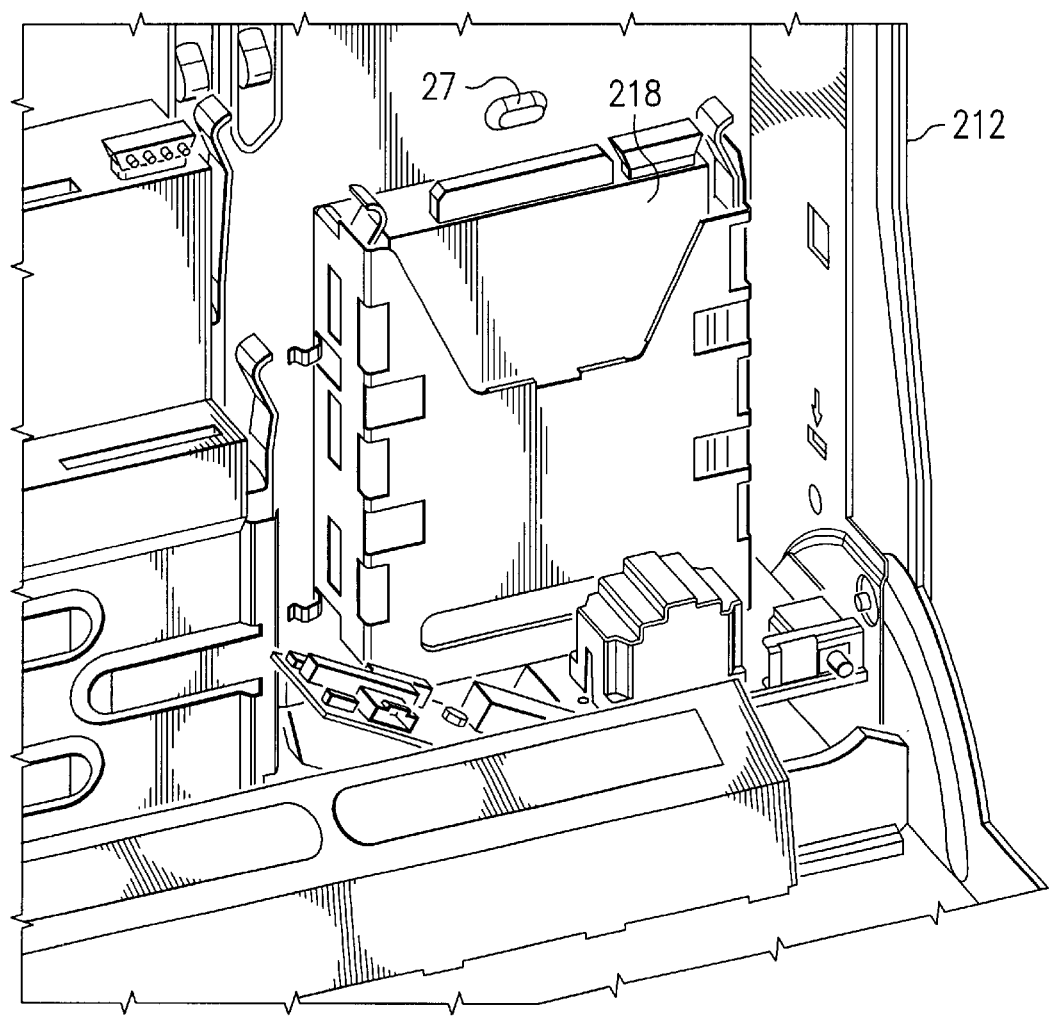
FIG. 5 is another partial view of the chassis of FIG. 3.

A computer chassis is generally designated 210 in FIG. 3, shown in an open position, and includes a first portion 212 pivotably connected to a second portion 214 so that the chassis 210 can be pivoted to a closed position wherein first portion 212 is nested with second portion 214. The second portion 214 includes a cooling fan 216 adjacent a power supply 217, see also FIG. 4, which draws air out of the chassis 210. In FIG. 3, the fan 216 is not visible but is adjacent the power supply 217. In so doing, an air flow is created and can be routed through chassis 210 as desired. As such, the air flow can be routed across heat generating and/or noise generating components mounted in chassis 210. One such component which generates heat and noise is a hard drive 218 mounted in the first chassis portion 212, see FIGS. 1 and 5.

Referring again to FIG. 3, housing 12 is snapped into engagement with a tab 27 in chassis portion 212 to encapsulate the hard drive 218. In this position, the shroud 34 of housing 12 is adjacent the fan 216 when the chassis is in the closed position, see FIG. 4.

Figure 6:
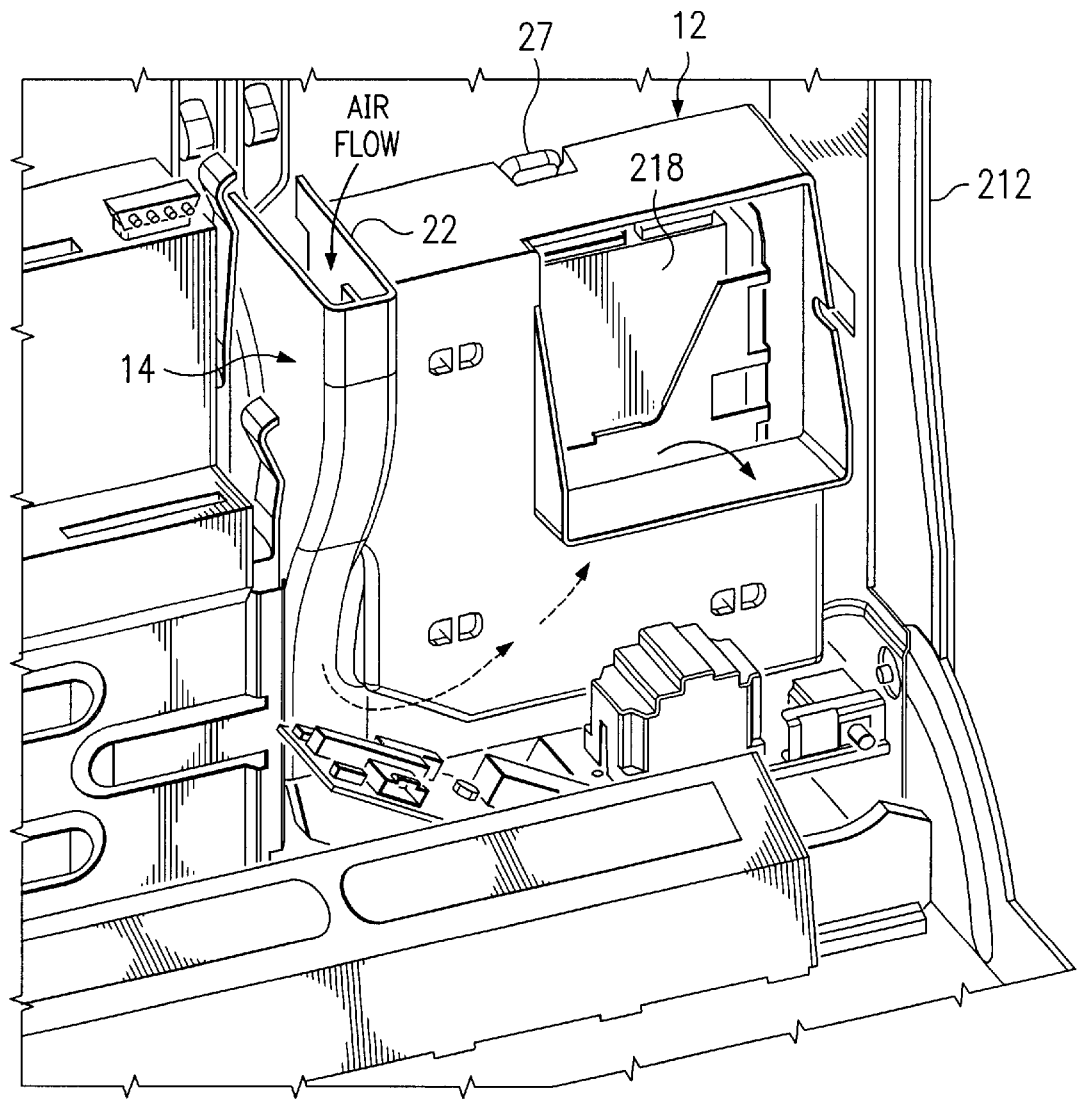
FIG. 6 is a further partial view of the chassis of FIG. 3.

As a result, when fan 216 is actuated, air flow is routed into the inlet 22, FIGS. 1 and 6, through the channel 14 to exit the channel 14 at the outlet 24. The air flow then moves across the sound suppression cavity 18 which contains the mat 20. The air flow then exits the chassis 210 via the port 16 and ultimately is drawn from the chassis 210 by the fan 216, thus removing heat and noise from chassis 210 which is generated by the hard drive 218.

As it can be seen, the principal advantages of these embodiments are that the device reduces noise and improves thermal performance by providing controlled, high-velocity airflow over the hard drive. The power supply fan can effectively monitor the temperature of the hard drive and adjust its speed accordingly to provide enhanced cooling with minimal noise. The assembly method makes the encapsulation scheme independent of the device mounting, providing easier assembly and greater flexibility. Instead of inserting the drive into an enclosure, the enclosure is snapped into place around the drive. This significantly reduces assembly time associated with other solutions. Because the shroud is not required to mount the hard drive, it is easily included or omitted from system configurations according to cost/benefit analyses. The resulting ducted enclosure is lined with sound attenuating acoustic foam that is mechanically attached, eliminating the need for adhesive or fasteners and reducing cost and recycling impact. Internal baffles improve sound dissipation and controlled intake and exhaust ensure that any noise escaping the enclosure is directed away from the user, further enhancing acoustic performance.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer system comprising:
   a chassis having a first portion and a second portion;
   a microprocessor mounted in the chassis;
   a storage coupled to the microprocessor;
   a hard drive mounted in the chassis and coupled to the microprocessor;
   a housing snapped into the first portion of the chassis and encapsulating the hard drive, the housing including an airflow channel, a fan shroud and a cavity between the channel and shroud;
   a sound suppression material in the cavity; and
   a fan mounted in the second portion of the chassis, whereby in response to the first portion of the chassis being combined with the second portion of the chassis, the fan shroud is positioned adjacent the fan.

2. The system as defined in claim 1 wherein the housing is a one-piece molded housing.

3. The system as defined in claim 1 wherein the channel is elongated to extend from a first end of the housing to a second end of the housing.

4. The system as defined in claim 1 wherein the housing includes a baffle.

5. The system as defined in claim 1 wherein the air flow channel includes an inlet and an outlet.

6. The system as defined in claim 5 wherein the inlet is a first size and the outlet is a second size, less than the first size.

7. A method for reducing heat and noise in a computer system comprising:
   providing a computer chassis having a first portion and a second portion;
   providing a cooling fan in one of the first and second portions of the chassis;
   mounting a hard drive in the chassis;
   mounting a housing in the other of the first and second portions of the chassis for encapsulating the hard drive, the housing including an airflow channel, a fan shroud and a cavity between the channel and shroud;
   providing a sound suppression material in the cavity;
   positioning the shroud in air flow communication with the cooling fan by combining the first and second portions; and
   activating the cooling fan to draw air through the housing, across the sound suppression material and through the shroud, whereby air drawn by the fan flows across the sound suppression material prior to exiting the shroud, thus removing heat and noise generated by the hard drive.

8. The method as defined in claim 7 further comprising: molding the housing into a one-piece unit.

9. The method as defined in claim 7 further comprising: extending the channel from a first end of the housing to a second end of the housing.

10. The method as defined in claim 7 further comprising: providing a baffle in the housing.

11. The method as defined in claim 10 further comprising: providing an inlet and an outlet in the channel; and forming the inlet to be of a larger size than the outlet.

12. An information handling system comprising:
   a computer chassis having a first portion pivotably connected to a second portion for movement between an open position and a closed position;
   a microprocessor mounted in the chassis;
   a storage coupled to the microprocessor;
   a snap-in, one-piece housing in the first portion of the chassis, the housing including an airflow channel, a fan shroud and a cavity between the channel and the shroud for receiving sound suppression material;
   a sound suppression material in the cavity, whereby air through the housing flows across the sound suppression material prior to exiting the port; and
   a fan mounted in the second portion of the chassis, whereby in response to the first portion of the chassis being closed with the second portion, the fan shroud is positioned adjacent the fan.

* * * * *